Dec. 31, 1963  I. GIAEVER  3,116,427
ELECTRON TUNNEL EMISSION DEVICE UTILIZING AN INSULATOR
BETWEEN TWO CONDUCTORS EITHER OR BOTH OF
WHICH MAY BE SUPERCONDUCTIVE
Filed Nov. 17, 1960  3 Sheets-Sheet 1

Inventor:
Ivar Giaever,
by His Attorney.

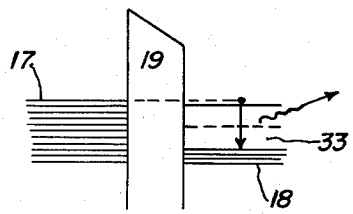
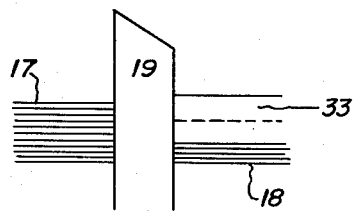
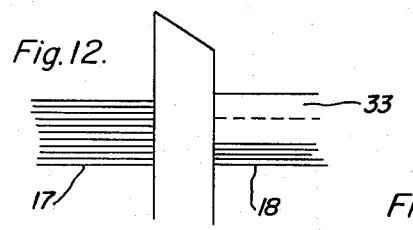
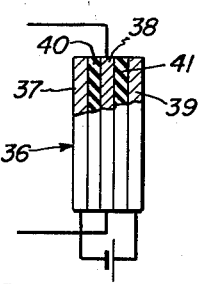
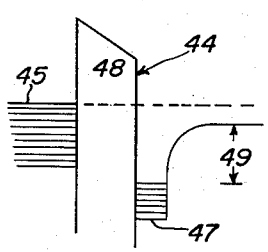
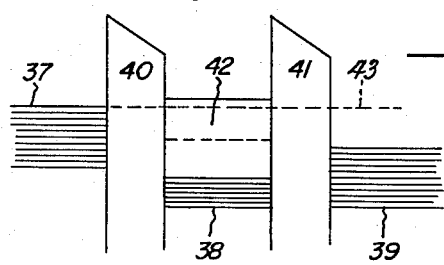
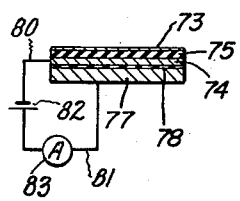
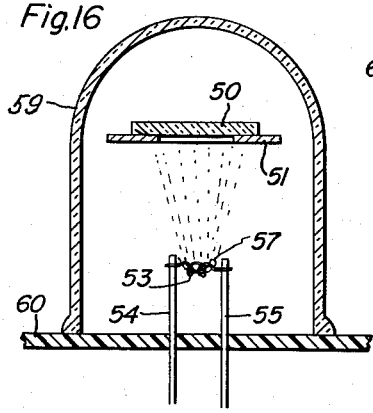
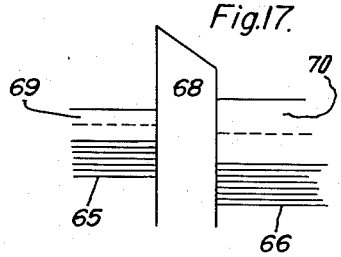
*Inventor*
*Ivar Giaever*

Dec. 31, 1963     I. GIAEVER     3,116,427
ELECTRON TUNNEL EMISSION DEVICE UTILIZING AN INSULATOR
BETWEEN TWO CONDUCTORS EITHER OR BOTH OF
WHICH MAY BE SUPERCONDUCTIVE
Filed Nov. 17, 1960     3 Sheets-Sheet 3
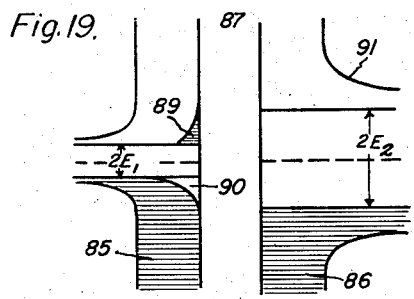
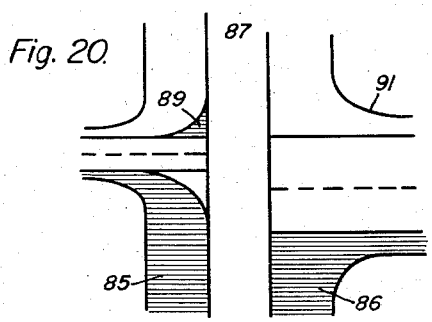
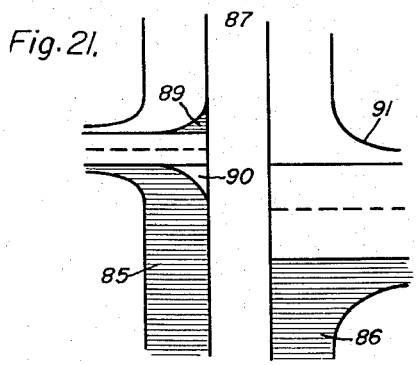
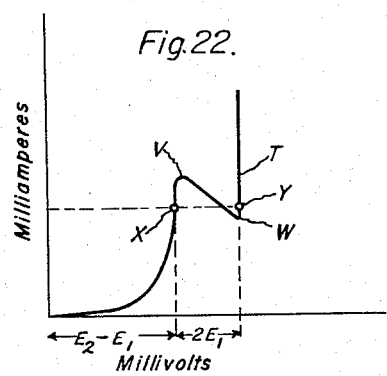
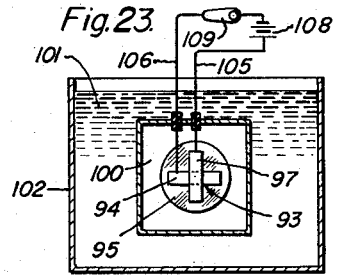
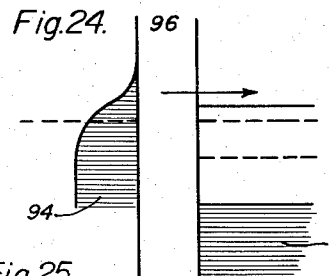
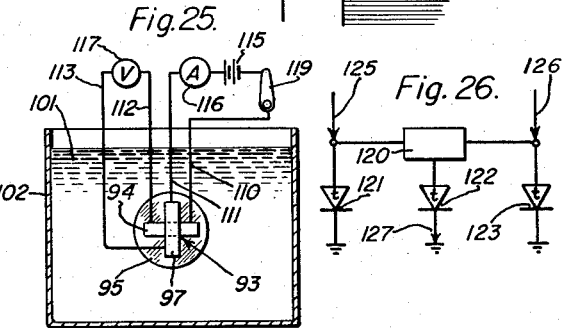
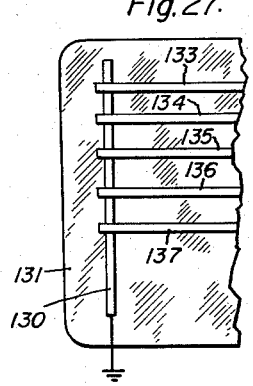
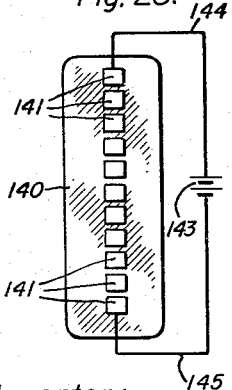
Inventor:
Ivar Giaever;
by His Attorney.

3,116,427
ELECTRON TUNNEL EMISSION DEVICE UTILIZING AN INSULATOR BETWEEN TWO CONDUCTORS EITHER OR BOTH OF WHICH MAY BE SUPERCONDUCTIVE
Ivar Giaever, Schenectady, N.Y., assignor to General Electric Company, a corporation of New York
Filed Nov. 17, 1960, Ser. No. 70,074
11 Claims. (Cl. 307—88.5)

The present invention relates generally to the electron tunnel emission art and is more particularly concerned with novel tunnel devices including diodes and triodes and with new circuits and systems incorporating them, and with a unique method of making such devices.

This is a continuation-in-part of my copending application Serial Number 40,621, filed July 5, 1960, and assigned to the assignee of this case, now abandoned.

The so-called "tunnel diode" of the prior art is a p-n junction diode device which is different from the previously conventional p-n diodes in material, construction and electrical characteristics. Thus, heavily doped semiconductors are used in the tunnel diode with the concentrations of electrons and holes more than $10^{18}$ cm.$^{-3}$ and the specific resistivity is less than 0.01 ohm-cm. When the carrier concentration is increased in excess of $10^{18}$ cm.$^{-3}$ distribution of the carrier follows Fermi statistics and the electrical properties of the semiconductor become metal-like.

As for its electrical characteristics, the tunnel diode of the prior art has the interesting property of a voltage controlled negative resistance in the forward direction for low voltages and this negative resistance is completely different from the negative resistance observed in the reverse direction of some previously known point-contact type diodes. In the p-type and n-type sides of the prior tunnel diode the excess acceptor concentration and excess donor concentration, respectively, are more than $10^{18}$ cm.$^{-3}$ (the acceptor concentration and the donor concentration are approximately equal to the hole concentration and the electron concentration respectively). There is, however, no inserted intermediate layer of intrinsic and other semiconductor material between the p-type and n-type sides since the p-n junction is of the abrupt type. In general, a space charge occurs at or near the plane of the p-n junction and this region is called a space charge region and it has a width of less than 200 angstroms ($2\times10^{-6}$ cm.) compared to the usually more than 1000 angstroms width of still earlier conventional p-n junctions.

By virtue of the present invention I have provided a novel electron tunnel emission device which even in its broadest structural definition is as different from the tunnel diode as that device is different from previously conventional p-n diodes described above. Further, in accordance with this invention, which is based upon my surprising discoveries, subsequently to be described, I have provided tunnel devices which differ from tunnel diode devices known heretofore not only in structure but also in mode of operation and in results. Thus these new devices are capable of performing functions and producing results which are altogether new and different in kind from the functions and results obtainable through the use of any previously known means or device. In one embodiment of this invention, for example, an electron tunnel emission triode is provided and this device is suigeneris.

In accordance with this invention I have further provided a novel method for producing tunnel devices, including both diodes and triodes, which is easy to control and carry out and is amenable to mass-production use with consistently good results.

Still further, my discoveries have enabled the development of an entirely new electronics system incorporating the novel tunnel devices of this invention and affording unique and valuable operational characteristics, uses and results. These discoveries have also enabled me to invent a refrigerator which is operative at liquid helium temperatures and yet is comparatively easily constructed and has extremely modest power requirements. Further, as a result of these discoveries temperatures in the liquid helium range can now be easily and continuously determined and the superconducting state can be readily detected in an element of a cryotron or similar device.

A specific embodiment of this invention of potentially great significance is the printed circuit computer memory array. As a result of the present discoveries, the construction of computers can thus be substantially simplified and the cost of these devices may be materially reduced without incurring any significant offsetting disadvantage.

This invention is predicated upon my unexpected and unpredicted discovery that the tunnel effect can, under certain critical circumstances, be obtained and controlled in a device comprising separate, independent and spaced-apart conductors. I further found that while only two elements are in theory necessary in such a device, a third element in the form of an insulator meeting the critical requirement as to continuity and permeability to tunneling electrons is as a practical matter normally an essential element of the basic structure. In one particular embodiment of this invention, however, the insulator may satisfactorily take the form of an air gap or even a vacuum gap. Still further, I have discovered that while the thickness of the insulating layer or film or gap is highly critical to the consistently satisfactory functioning of this new device, the conductor elements may within broad limits be of any desired thickness dimension. Suitably, in a laminated type of construction the conductor elements will be in the form of films or sheets of comparable thickness an order of magnitude or two greater than the maximum operable thickness of the insulating layer between them.

I have also found that this basic structure, whether laminated or not, can be supplemented or multiplied by duplication of the basic elements to produce a device having three or more conductor elements, providing always that the critical spacing is maintained between the conductors so that adjacent conductors will not be dead shorted against each other, but tunneling electrons can traverse the space between those conductors. Additionally, I have found that in any of the devices including the basic diode, electrode connections may be made in any suitable conventional manner so that the novel tunnel device may be incorporated in an electrical circuit to perform its unique function for any of a variety of purposes subsequently to be described.

In the course of making this invention I further discovered that the critical spacing between conductors of my new tunnel device of the laminated or sandwich type can advantageously be provided by a method which includes as an essential step the oxidation of a thin surface portion of one of the conductor elements of each conductor pair in the device. Such an oxide film in the usual case thus will be securely bonded and held to the host metal body and will provide a good basis on which to deposit or apply the second conductor without shorting.

Stated in the broadest terms, this embodiment of the method of this invention comprises the steps of forming a first metal film, providing an electrically-insulating, continuous but tunneling-electron permeable coating on said first metal film, and then depositing a second metal film on the said insulating coating. As indicated above, the metal films may actually be relatively heavy and thick bodies by comparison with the critically thin intermediate insulating coating or layer.

While aluminum provides a good conductor element in these new devices and also affords almost an ideal material for in situ production of the insulating film or coating there are other materials which may be employed as equivalents of aluminum for this purpose and they may be normal conductors, superconductors or semiconductors according to the functional characteristics desired in the ultimate novel tunnel device. Whether aluminum or another metal or material is used, however, the method, as those skilled in the art will understand, will be generally the same and insulating coating will be provided suitably by oxidation of a thin surface portion of the host or metal element. Alternatively, the insulating coating may be provided by some other reaction in which the metal element of the ultimate new tunnel device serves as a reagent and the reaction product is an insulator in the same way and to substantially the same effect in this device that the foregoing oxide coating is. Thus, for example, a sulfide film may be provided as an insulator for the purposes of this invention, particularly where the metal element of the device is of copper. Copper sulfide is believed to have a superconductive state or to resemble a superconductor state or to resemble a superconductor under certain conditions and it is contemplated by the appended claims that a device of this invention may include an insulating layer or coating component which is superconducting at certain stages or under certain conditions of use. Similarly, selenide, arsenide, nitride, chloride, fluoride, bromide, iodide and even carbide coatings may be used in place of the oxide coatings described above as the insulating but tunneling-electron permeable intervening or spacing layer of the present invention devices. Also, inorganic compound coatings may be employed such as nylon, the various vinyl resin polymers, and in fact any film-forming material including water-soluble materials.

The second conductor will be deposited or applied or otherwise be brought into contact, with insulating coating as the final step of the method. Here again, there are a wide variety of conductor materials that may be employed and selection will be on the basis of a number of considerations including the kind of device and operating characteristics desired and the compatibility of the second conductor material with the insulating coating material under conditions of manufacture and use.

I have further found that the critical spacing between conductors of my new tunnel device of the laminated or discontinuous film type can advantageously be provided by a method which includes as an essential step the establishment of a plurality of separate, spaced-apart deposits or spots or "islands" of electrically-conducting material on an insulating substrate body. In this method, the deposits are either formed separately or individually or are laid down on the substrate surface in the form of a continuous film from which material is removed, as by evaporation, to produce the desired islands. Alternatively, the islands may be formed by heat treating the continuous film to agglomerate it. Those skilled in the art will understand that the resulting discontinuous coating will suitably be of essentially uniform thickness although it is contemplated that the coating components or deposits may be built up in thickness if that may be desired for any purpose. Further, it will be understood that the discontinuous coating will desirably extend from one edge to another of the substrate body and thus comprise a plurality of islands forming in effect, a chain or path across the substrate surface.

In a variation of this embodiment, the deposits of conducting material may be deposited within a substrate body instead of on its surface in which case the tunnel current will flow through intervening portions of the substrate body instead of through the air gap or vacuum gap between islands on the substrate body surface. Further, the substrate body may be of practically any material which is electrically non-conductive under the conditions of use, glass being preferred, however, because of the ease with which adherent metal deposits may be provided on its surface and because of the wide temperature ranges to which glass may be subjected without significantly changing its electrical properties or its other physical characteristics important in the contemplated use. The conducting materials may be those metals identified above and metals in general and likewise, copper sulfide may be employed in this embodiment of the invention.

In one embodiment of its apparatus aspect of the present invention, broadly described, comprises a first conductor, an insulator and a second conductor in a sandwich-like arrangement, the insulator being in the form of an electron permeable continuous film disposed between and separating the conductors and being in contact with opposed surfaces of these conductors. One or both of the conductors may be a normal conductor, or it may be a superconductor or a semiconductor under operating conditions, depending upon the functions required of the device. Thus, the device will include means for maintaining one or both of the conductors below its critical temperature where one or both of the conductors should be in the superconductive state during at least a part of the period that the device is in use. The device may further generally include magnetic field generating means arranged to subject a superconducting conductor element to a magnetic field of strength sufficient to destroy partially or completely the superconducting state in that element. Alternatively or additionally, the device may include means for flowing an electric current through a superconducting conductor element of the device to destroy partially or completely the superconducting state in that element.

As previously indicated, another embodiment of the apparatus of this invention in general comprises a discontinuous, electrically-conductive coating on a suitable substrate body, the components or islands of the coating being spaced or separated from each other for electron tunneling action by an air gap or a vacuum gap or by material of the substrate body itself. While the spacing between adjacent islands is highly critical, just as in the case of the sandwich construction described above, the relative thickness and area of the islands and the ratio of their masses do not have an important bearing upon either the operating characteristics of the device or the electron tunnel emission results obtained. The islands should thus be separated by a distance of from two to 100 angstroms so that tunneling electrons may travel between these adjacent islands to produce the tunnel current just as in the case of the laminated or sandwich embodiment.

Lead wires are suitably attached to separate islands as, for example, at opposite edges of the substrate body bearing the discontinuous coating. Consequently, whether the discontinuous coating consists of only two relatively large islands, or a much larger number of small islands outlining a path across the substrate surface, a tunnel current, will under certain conditions flow between islands and in the latter case, there will be a series of such currents bridging the gaps between adjacent islands of the chain extending entirely across the substrate body.

The novel electric circuits of this invention in general comprise a tunnel device including two conductor elements and separated by either an air gap or by a continuous insulating electron-permeable film bearing against opposed surfaces of these two conductor elements, and a power source connected to the conductors. More specifically, in a preferred embodiment of this aspect of the invention, the tunnel device includes a conductor element which has a superconductive state and a normal resistive state. Additionally, this device will desirably include input means effective to destroy the superconductive state of this element and thereby modify the resistance across the insulating film or air gap. As will be described in detail below, electrical apparatus and circuits meeting these generalized definitions may serve a wide variety of uses such as amplifiers, negative resistance devices, infrared photon generators and detectors, high frequency phonon generators and detectors, computer memory components, low temperature thermometers, and cryogenic refrigerator elements.

A further and better understanding of this invention will be gained from the detailed description of several embodiments set forth below, reference being had to the accompanying drawings in which:

FIGURE 10 is an energy diagram illustrating the use of the device of FIGS. 1 and 2 as an infrared generator;

FIGURE 11 is a diagram like FIG. 10, illustrating the insulating effect of the superconductor element under a certain forbidden gap condition relative to the Fermi level of the normal conductor element of the diode device of FIGS. 1 and 2;

FIGURE 12 is an energy diagram like FIG. 11, illustrating the electron-exciting effect of radiation applied to the normal conductor to overcome the insulating effect of the superconducting electrode;

FIGURE 13 is a view like FIG. 2 of a tunnel triode device of this invention with a portion broken away for clarity;

FIGURE 14 is an energy diagram illustrating the energy level relationship in the FIG. 13 device when the device is operated so that the middle conductor is a superconductor and showing also how the current flow can be controlled through controlling the energy gap width of the superconductor or its potential;

FIGURE 15 is an energy diagram illustrating the energy level relationship and the operating principle of another novel tunnel device of the present invention;

FIGURE 16 is a cross-sectional, somewhat schematic, view of apparatus implementing the novel method of this invention for the production of these new tunnel devices;

FIGURE 17 is an energy diagram illustrating the energy level relationship and operating characteristics of still another embodiment of this invention wherein both conductor elements of the novel tunnel device are superconductors;

FIGURE 18 is an enlarged, cross-sectional view of a cryotron incorporating the novel device of this invention;

FIGURE 19 is another energy diagram showing the density of states of two conductors and illustrating the energy level relationship and the operating principle of a tunnel device of this invention in which both conductors are in their superconducting state;

FIGURE 20 is a diagram like FIG. 19, illustrating the effect of the establishment of an electrical potential difference between the two conductor elements;

FIGURE 21 is another diagram like FIG. 19, showing the effect of still further increasing the voltage;

FIGURE 22 is a chart bearing a curve which illustrates the negative resistance characteristic of FIG. 19 couple which appears during the operation depicted in FIGS. 19 to 21;

FIGURE 23 is a partially diagrammatic view of a low-temperature refrigeration apparatus of this invention;

FIGURE 24 is an energy diagram illustrating the principle of operation of the refrigeration apparatus of FIG. 23;

FIGURE 25 is a view like FIG. 23 illustrating a low-temperature thermometer of this invention;

FIGURE 26 is a wiring diagram of a new analogue computer device including a tunnel emission element of this invention;

FIGURE 27 is a fragmentary plan view of a "printed" circuit of this invention suitable for use as a computer memory array component; and, FIGURE 28 is a partially diagrammatic view of a tunnel emission device and circuit of this invention including a discontinuous conductor film.

Figure 1:
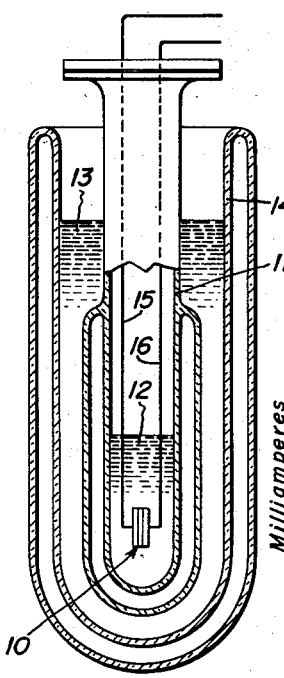
FIGURE 1 is a vertical, sectional view of a cryostat apparatus embodying a novel tunnel device of this invention in operative relation to an electric circuit.

As shown in FIG. 1 in a preferred embodiment of this invention, the novel tunnel emission device is operated at extremely low temperature. Thus tunnel device 10 of this invention is located in a cryostat, being located within the lower portion of inner Dewar flask 11 below the level of a body 12 of liquid helium. The lower part of flask 11 is disposed below the surface of body 13 of liquid nitrogen contained in an outer Dewar flask 14. Device 10 need not be sealed against contact with liquid helium although it is contemplated by the appended claims that the tunnel device may suitably be enclosed in a liquid-tight container, the important requirement being that the refrigeration be effective to reduce the temperature of the device below the superconducting critical temperature of a superconducting element.

Wires 15 and 16 connect device 10 to circuit components (not shown) outside the cryostat and including a power source and suitable output or readout means.

Figure 2:
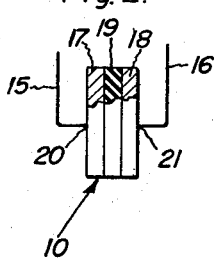
FIGURE 2 is an enlarged view, partly in section, of the tunnel device of FIG. 1.

Device 10, as illustrated to best advantage in FIG. 2, consists of three elements, namely, a first conductor, element 17, a second conductor element 18 and an insulator element 19, disposed between and separating conductors 17 and 18 and bearing against opposed surfaces thereof. Conductors 17 and 18 are shown as being thin films or sheets, but they may be in the form of rather thin strips. In any event, however, the insulator 19 must be of size and shape sufficient to provide continuous effective insulation against normal electrical conduction between opposed surfaces of the two conductor elements. Further, insulator 19 must be thin enough that it can be penetrated by electrons tunneling from one conductor to the other. In absolute terms, insulator 19 is in the form of a film from two angstroms to 1,000 angstroms in thickness and it will be understood that there is no practical necessity for the insulator film to be substantially uniform in thickness within these limits. Further, as a practical matter, I have found that an insulator of from about 15 to 20 angstroms in thickness can be readily produced in accordance with the method of this invention and that such an insulator film will produce in the present new devices and circuits or systems including them the unique functions and results stated above.

Connecting wire or electrodes 15 and 16 are suitable electrically connected to conductors 17 and 18 in electrode junctions indicated at 20 and 21, respectively.

Although in FIG. 2, conductors 17 and 18 are illustrated as being of approximately the same thickness as insulator 19, it will be understood that in practice the conductor elements will preferably be of greater thickness than insulator 19 by at least an order of magnitude or two. This is a matter of preference based upon production practicability rather than operational characteristics, the new functions and characteristics of the new device being obtainable with extremely thin conductors as well as with those which are relatively thick and massive. The critical thing, again, is the thickness and the insulating effectiveness of the intermediate, tunneling-electron permeable film.

Figure 3:
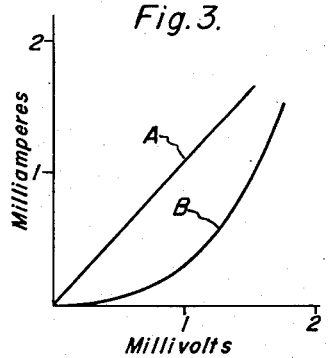
FIGURE 3 is a chart bearing curves illustrating electrical characteristics of the tunnel device of FIGS. 1 and 2.

Interesting and unusual characteristics of tunnel device 10 are shown in FIG. 3, where current is plotted against voltage. Curve A represents the current-voltage relationship in one instance over a range of about two millivolts and two milliamperes when the device is operated under conditions such that conductors 17 and 18 are both in normal resistive state. With conductor 18 being a super-conductor at liquid helium temperature and the device being operated at a temperature below the boiling point temperature of liquid helium, curve B represents the current-voltage relationship over the same voltage and ampere ranges. As the voltage is increased, the current flowing through the device increases in direct proportion in the first case. However, with the device at liquid helium temperature as it is in the invironment represented in FIGURE 1, there is a radical departure from relationship represented in curve A and as shown in curve B, substantial increases in voltage do not result in proportional increases in current, particularly in the lower portion of the voltage range.

Figure 4:
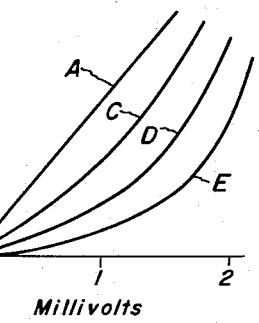
FIGURE 4 is a chart similar to that of FIG. 3, illustrating the effects of temperature variations within a critical range upon the electrical characteristics of the aforesaid tunnel device.

The effect of temperature upon current-voltage relationship device 10 at temperatures below the superconducting critical temperature of conductor 18 is illustrated in FIG. 4. Again curve A illustrates the normal resistive state relationship between voltage and current in device 10, but curve C shows the voltage-current relationship over the same voltage range as curve A where the temperature at which device 10 is operated a little below the superconducting critical temperature of the metal of element 18. Curve D, then, represents the voltage-current relationship of this device where the temperature of operation of the device is still further below the superconducting critical temperature and curve E represents the voltage-current relationship in the device where the operating temperature is still lower.

The influence of magnetic field upon the voltage-current relationship of device 10 is similarly illustrated in FIG. 5 where curve A again represents the normal resistive state. Curve F represents voltage-current data gathered when the magnetic field applied to device 10 was almost as high as the critical magnetic field value for element 18 at the operating temperature. Curve G likewise represents data gathered when the magnetic field was substantially less than that applied in the curve F experiment, and curve H represents the voltage-current data obtained when device 10 was subjected to a still weaker magnetic field .

It will be understood that different conductors, that is, conductors of different metals in which the super-conducting state can be created, will have qualitatively similar but quantitively different transition characteristics. Consequently, in the construction of diodes and triodes like device 10 the operating characteristics desired may within limits be obtained through selection of the superconducting element.

Figure 6:
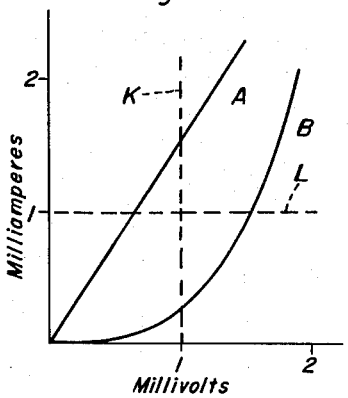
FIGURE 6 is a chart like FIG. 3, indicating variations in voltage at a constant current and variations in current at constant voltage in the said device as the superconductive state is established and destroyed in a conductor element.

The operating characteristics of device 10 in a series circuit under constant voltage and under constant current are indicated respectively by lines K and L of the chart of FIG. 6 where curves A and B correspond to those of FIG. 3 and the coordinants are the same. By connecting wires 15 and 16 to constant voltage supply (approximately one millivolt in one case), current through insulator film 19 can be varied from a value approaching two milliamperes (where line K intersects curve A) to something less than one-half milliampere (where line K intersects curve B). This change in the current flow through the insulator film is due solely to the transition of the superconductor element 18 from its normal resistive state to its superconductive state as represented by curve B. Similarly when wires 15 and 16 are connected to a constant current supply (approximately 1 milliampere in one case) the voltage across insulator 19 may be varied from approximately one-half millivolt (where line L intercepts curve A) to 1.5 millivolts where line L intercepts curve B) as the superconductor element 18 goes from its normal resistive state (curve A) to its superconductive state (curve B).

Figure 5:
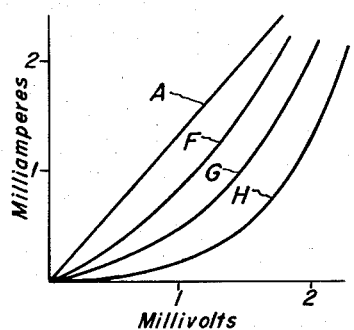
FIGURE 5 is likewise a chart similar to that of FIG. 3, depicting the effect of magnetic field variations within a critical range upon the electrical characteristics of this tunnel device.

Again, it will be understood from the foregoing description that transition from the normal resistive state to the superconductive state and vice-versa may be accomplished by subjecting device 10 and particularly conductor 18 to varying temperatures or varying magnetic field strength, as represented by FIGS. 4 and 5. Further, it will be understood that the superconductive state in conductor 18 may be destroyed by passing a current through that element even though the temperature and magnetic field conditions are within or below the superconducting critical limits.

Figure 7:
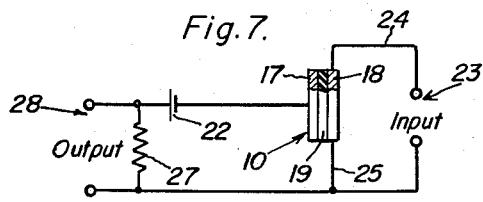
FIGURE 7 is a diagram of an amplifier circuit incorporating the present novel tunnel device.

Used in a circuit to produce amplification of an input signal the tunnel device 10 is employed as a triode as shown in FIG. 7, contacts being made to the upper and lower ends of superconducting element 18 and the device being connected in series with a constant voltage supply 22. The signal to be amplified indicated as input 23, then is applied to element 18 in its superconductive state through electrodes 24 and 25 with the result that current flowing through element 18 will modify the resistance across insulator film 19 in the same general manner that the application of a magnetic field to the superconducting element would. The circuit is completed with resistance 27 and suitable readout or output means 28 as those skilled in the art will understand.

Figure 8:
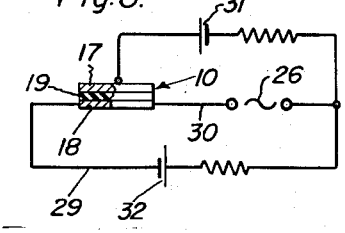
FIGURE 8 is a diagram of a circuit in which the said novel tunnel device functions as a negative resistor.

In the diagram of FIG. 8, device t10 is employed in a circuit possessing negative dynamic resistance. Superconducting element 18 has two electrode connections 29 and 30 and conductor 17 is connected to the constant voltage supply 31. A second constant voltage supply 32 is connected by electrode 29 to conductor 18. An input signal is provided suitably as indicated, by an alternating current source 26 connected to element 18.

Figure 9:
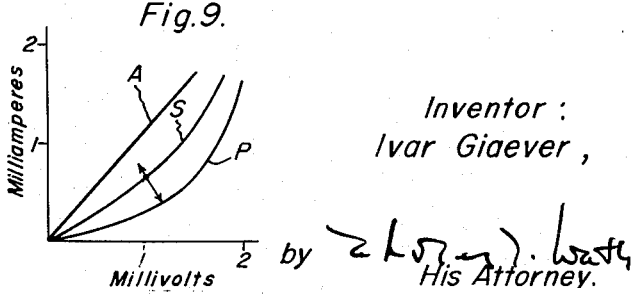
FIGURE 9 is a chart like that of FIG. 3 showing how the negative resistance characteristic is developed in the tunnel device in the FIG. 8 circuit.

As indicated in FIG. 9, current varies with voltage in the FIG. 8 device in response to an alternating current signal from source 26. This, as those skilled in the art will recognize, is a negative resistance type of function but unlike the negative resistance devices of the prior art, this one can be regulated or adjusted to meet the needs of any of a wide variety of circuits and circuit components. Thus, for instance, by lowering or raising the operating temperature the extent of negative resistance may be altered. In other words in this way the extent of the departure from curve A can be fixed within the limit defined by curve P, which corresponds to curve B of FIG. 3 in that it represents the data gathered when the superconductor was in its maximum superconductive condition, rather than in an intermediate condition as represented by curve S.

The effect of the alternating current signal in the FIG. 8 device is to change the superconducting element 18 from its superconducting condition to its normal resistive state and back again with each cycle of the alternating input signal. Accordingly, this input signal supplements first one of power sources 31 and 32 and then supplements the other one. The amount of current flowing through element 18 varies depending upon which of these power sources is augmented by (or diminished by) the alternating input signal, and it is the amount of current flowing through element 18 which at any given instant determines whether that element is superconducting or normal.

In FIG. 10, the use of the FIG. 2 element in an infrared generator is illustrated. Again, the normal conductor element is identified by the reference character 17 while the superconductor shown is 18 and the insulating film is 19. With a voltage differential established through film 19 and the density of states differential having the upper level of conductor 17 above forbidden gap 33 on the superconductor, electrons will tunnel through insulating film 19 and descend to the level of conductor 18. The resultant loss of energy in the electrons thus tunneling through to the superconductor element is signified by the arrow. The energy released may take the form of either infrared photons or high frequency phonons, or both.

In FIG. 11, the top of forbidden gap 33 of superconductor 18 is above the Fermi level of conductor 17. As a result, practically no current will flow through the device, the superconductor prohibiting electrons from tunneling through insulating film 19.

In FIG. 12, the same relationship between the superconductor and gap 33 on one hand and conductor 17 on the other hand, prevails as in FIG. 11. FIGURE 12, however, due to irradiation, electrons of conductors 17 are excited and raised to an energy level sufficient that they tunnel through insulator 19 after the manner described in connection with FIG. 10. This irradiation may be effected by infrared photons and accordingly the device of FIG. 2 may be used as an infrared detector as well as an infrared generator simply by changing the relationship of the top of forbidden gap 33 of the superconductor element and the Fermi level of the conductor.

Another tunnel device 36 of this invention is shown in FIG. 13. Triode 36 is similar to device 10, but includes an additional conductor element and an additional insulator film. Thus conductor elements 37, 38 and 39, one or more of which may be a superconductor under certain critical conditions, are separated in a sandwich-like construction by insulating films 40 and 41. Again, the insulator films will necessarily be effective to provide an insulating gap between adjacent conductor elements and at the same time these films will be permeable to electrons tunneling from one conductor element to the other as described above in reference to tunnel device 10. Suitably, device 36 will be made in the manner to be described below and except for the additional elements will correspond in structure details to device 10, the same latitude with regard to relative dimensions, particularly thickness of the conductor elements, being appropriate here as in the device in FIG. 2. Likewise the electrical connections, leads or electrodes are suitably joined to tunnel device 36 in accordance with any practice known in the art satisfying the operator's requirements.

Operating characteristics of one embodiment of the device of FIG. 13 are illustrated in the energy diagram of FIG. 14 wherein reference characters are applied in accordance with the foregoing description. The energy gap or forbidden gap in superconductor 38 is indicated at 42, it being understood that in this instance conductors 37 and 39 are normal conductors. Tunnel current is indicated by the dotted line 43. In this case it will be understood that if voltage is applied to conductors 37 and 39, electrons will tunnel through the insulating films and through gap 43. At a constant voltage applied to conductor 37, the current flowing through device 36 can be controlled by regulating the position of the top of gap 42 of superconductor 38. From the foregoing description it will be apparent that the top of gap 42 can be adjusted by applying a magnetic field to the superconductor, by passing a current through the superconductor, or by varying the operating temperature of the superconductor as well as by applying a voltage to conductor 38. Regulation of voltage, current, magnetic field or temperature will provide control over the gap width or position. In any of these instances, except for the application of a voltage, which moves the forbidden gap vertically, the tendency will be to narrow the gap in the case except where temperature change involves reducing the temperature of the superconductor in which case the gap is widened until it reaches a maximum value which will depend upon the metal of the superconducting element.

By varying the width of the forbidden gap in superconductors in devices of this invention, these devices can be "tuned." The width of the gap determines the frequency of the energy released through the tunneling action as indicated in FIG. 10. The intensity of the energy release, i.e., the volume of the tuned output signal, will be determined by the potential difference across the insulating film or in other words the current flow through the device.

In still another tunnel device 44 of this invention depicted in the energy diagram of FIG. 15, a cathode 45, suitably of aluminum, is separated from a thin gold film 47 by a continuous insulating film 48 which as in the foregoing cases is electron-permeable and in this case is suitably of aluminum oxide with thickness of about 50 to 1000 angstroms. As the diagram indicates, the Fermi level of aluminum element 45 stands somewhat above that of gold film 47 by virtue of the voltage applied across the insulating film. This device consequently operates on the tunneling principle, electrons tunneling through insulating film 48 and a fraction of these electrons going through the thin gold film and escaping into the vacuum in which device 44 is maintained in operation at room temperature. (In this instance the device may replace a standard glowing emitter in a standard vacuum tube.) Further, secondary electrons are created in gold film 47 and these can escape over the work function indicated at 49. The FIG. 15 system may be used as a cold cathode in conventional tubes with the advantage of low noise level and high efficiency compared with hot filament tubes. Used as an amplifier, the system makes use of gold film 47 as a grid.

Metals other than gold may be used in device 44 and preferably metals of low work function such as sodium and the other alkali metals will be used as film 47 and suitably this film will be vapor-deposited as described elsewhere herein. Similarly, as indicated elsewhere herein, metals other than aluminum and insulating films other than aluminum oxide may be used in this tunnel device. Preferably the insulating film should be of a material having a high dielectric strength and the tendency for electron scattering in the device should be low.

The device represented by the energy diagram of FIG. 17 comprises conductors 65 and 66 both of which have a superconductive state, and an insulating but tunneling electron-permeable film 68. These conductors may suitably be of tantalum and lead, respectively, and film 68 may be of tantalum oxide. Under conditions of use with the conductors in their superconducting states they have forbidden gaps 69 and 70, respectively.

As will subsequently be explained, under certain operating conditions, i.e., with the superconductive state established in conductors 65 and 66, this FIG. 17 device will display a "negative resistance" characteristic enabling its practical use as amplification means. Further, there is reason to believe that this device can be "tuned" in such use to meet special circuit conditions and requirements. It is accordingly contemplated that this FIG. 17 device may be substituted for the tunnel diode of the prior art in a wide variety of systems and circuits.

The FIG. 18 device is a cryotron with which is combined an electron tunnel emission device of this invention. Actually, the cryotron and the tunnel device in this case share a common element which thus serves two purposes or functions in the novel combination. Basically, the cryotron comprises a film of lead 73, a film of tin 74, an insulating layer 75 of SiO separating and electrically insulating the lead and tin films from each other, an aluminum body 77 and an electron-permeable continuous film 78 of aluminum oxide separating the aluminum body from the tin film.

The FIG. 18 device may be made according to the detailed disclosures of the method of this invention and by applying the SiO film and the lead film through heretofore conventional vapor deposition procedures. In a typical case the lead film will be one micron thick and 25 microns wide, the tin film will be 0.3 micron thick and two millimeters wide and the SiO layer will be 0.4 micron (i.e., 4,000 angstroms) thick and consequently impenetrable to tunneling electrons.

In operation this FIG. 18 device as a cryotron unit will be maintained at a temperature which is low enough that the tin and lead films may be in their superconductive states. The device thus may be coupled into an otherwise conventional cryotron circuit or assembly as, for example, in a computer component array, and at any time desired the state of tin film 74 can be readily determined. In this device if film 74 is in its superconductive state it acts as an insulator relative to a potential applied to body 77 so that a high resistance can be measured across the device, i.e., through film 78. On the other hand, if tin film 74 is in its normal resistive state, the resistance across the device may be at least an order of magnitude smaller than in the former case. Suitable connections or electrodes 80 and 81 are provided to apply voltage from a suitable source 82 to the aluminum body and to connect the tin film in the circuit with such power source and any desired readout means 83 for direct or indirect determination of electrical resistance through film 78.

Those skilled in the art will gain a further understanding of this invention from the following illustrative, but not limiting examples of the manner in which I have carried out the process of this invention in the production of these new devices:

Example I

With reference to FIG. 16, I have prepared the FIG. 11 device by an evaporation and condensation technique, using a tungsten filament as a heat source to deposit successive layers of metal on a suitable substrate body in a vacuum. In particular a glass slide 50, three inches long by one inch wide placed on a metal mask 51 on a suitable support (not shown) in proximity to a tungsten filament 53 connected by leads 54 and 55 to a source of power. Mask 51 has a longitudinally-extending slot one millimeter wide longer than slide 50 so that the slide is exposed over its full length when placed on the slide in preparation for the first deposition operation. After placing a small amount of fine aluminum wire 57 on the tungsten filament, bell 59 is placed over the assembly and on supporting base 60 against which the bell seals around its periphery. By vacuum pump means (not shown) bell 59 is evacuated and a vacuum of about $10^{-5}$ mm. of mercury is established in the bell chamber. Then the circuit including leads 54 and 55 is closed and the filament is thereby energized with the result that the aluminum wire 57 is vaporized to condense on the unmasked one millimeter band portion of glass slide 50. The vaporization process is accomplished in a matter of a few seconds and then the filament is disconnected from the power source and air is admitted to the bell chamber. During this entire operation the temperature of the glass slide is essentially unchanged, that is, it remains at approximately ambient room temperature throughout the experiment, the heat input through the tungsten filament being negligible in this respect.

A film of lead is provided by repeating the foregoing operation except for turning slide 50 through 90° relative to mask 51 and for the substitution of a small amount of thin lead foil for aluminum wire 57. Again the operation is accomplished rather quickly due to the fact that the lead foil is rapidly heated to its vaporization temperature and is likewise rapidly condensed on the aluminum-coated, unmasked portion of slide 50. Actually, this deposition of the lead film is on a continuous but extremely thin film of aluminum oxide and covers a one millimeter square portion of the aluminum film previously formed on slide 50, the aluminum film and the lead film together defining on slide 50 a centered cruciform figure extending to the four edges of the rectangular slide top or bottom surface. The aluminum oxide film forms to the desired thickness and continuity simply by permitting air to contact the freshly-deposited aluminum film for a period of 5 minutes or so. The aluminum oxidation reaction takes place at room temperature at a rate such that insulating films which are satisfactory for the purposes of this invention will consistently be formed in from 5 to 10 minutes.

Contacts or electrodes are provided by means of standard metal spring clips to the metal films and slide 50, the contacts being made near the far ends of the cruciform coating figure. The amount of aluminum and the amount of lead used (two milligrams of each) are such that the films of aluminum and lead constituting the conductor elements of the tunnel device were each approximately 1000 angstroms thick.

In the actual tests performed with this FIG. 11 device, a standard six-volt automobile storage battery was used, suitable resistance and rheostat being connected in the circuit so that one millivolt was delivered to the test device. For readout a potentiometer and a galvanometer were used.

Example II

With reference to FIG. 17, a tunnel emission device of this invention comprising two superconductors, namely a lead film and a tantalum film may be provided by following the procedure set forth in detail in Example I above. In this instance the tantalum foil or wire serving as the source of the vapor-deposited tantalum film is vaporized first from tungsten filament 53 and then the tantalum is oxidized by admitting oxygen to the bell chamber to form an electron-permeable coating or film which will serve to maintain the tantalum film out of direct contact with the subsequently deposited lead film.

The lead in suitable form is then vaporized by the tungsten electrode, as previously described, and a lead film is deposited on the tantalum oxide coating of the lead film in the vacuum of the bell chamber. In this instance the glass slide used as the superstrate body is of the same general dimensions as in Example I and the tantalum film, the lead film and the intervening oxide coating would also be of approximately the same dimensions as the conductor films and the insulating film described in Example I.

The operating characteristics of FIG. 17 device will clearly be different from those of the device of FIG. 11 due to the fact that under the conditions of use both conductor elements would be maintained at a temperature below their superconducting critical temperatures and the characteristic superconductor gap would then appear on both sides of the insulator as the energy diagram of FIGURE 17 illustrates.

Example III

In still another operation embodying the method of this invention for the production of these new devices, a copper film may be provided on glass slide as described in Example I. A thin film which is electron-permeable but continuous may be provided on the exposed surface of the copper film formed on the glass slide. This may be accomplished by exposing the copper to hydrogen sulfide gas at a temperature such that the copper will be converted in situ to cuprous sulfide to an extent corresponding to that represented by the oxide conversion of the aluminum body in accordance with Example I.

Subsequently the coating of tin may be laid down on the copper sulfide film, again through the use of tungsten filament 53, tin being vaporized by the filament heat. In this case, it is believed that the insulating film under certain circumstances will as a superconductor still further increase the versatility of the device for various applications.

The copper and tin films and the copper sulfide coating will again be of the order and magnitude of thickness set forth in Example I for the corresponding components of the device of FIG. 11.

*Example IV*

Following the procedure of FIG. 1 in providing still another type of electron-permeable coating or layer for separating the conductor elements of the tunnel device, a film of tantalum is vapor deposited on glass slide 50 under the vacuum conditions described in Example I. Then the slide together with its tantalum coating is dipped once in a body of water upon which a film of stearic acid one molecule thick has been provided. The resulting stearic acid-coated tantalum deposit is then provided with an overcoat of tin, again by the vapor-deposition technique above. As in the foregoing examples the film thicknesses and the thickness of the intermediate coating are functional within the ranges stated above for the corresponding components of the other devices specifically described and accordingly the present device may be expected to exhibit the characteristics of the other devices of this invention.

*Example V*

Again following the procedure set out in Example I, I have made another device of this invention by vapor depositing a film of aluminum on a glass substrate like glass slide 50 of FIG. 16, and then producing in situ an aluminum oxide coating on the aluminum film merely by admitting air into the bell chamber to contact the freshly formed film. Finally, I vapor-deposited a film of gold on the aluminum oxide coating on the aluminum film and the resulting device had the energy diagram indicated in the drawing of FIG. 15. Again, the aluminum was of thickness of the order of magnitude of the conductor films of Example I and the aluminum oxide coating and the gold film were approximately 150 angstroms thick and therefore functionally the same as the corresponding insulating portion in the other devices of this invention previously described in detail.

To test the operating characteristics of this FIGURE 15 device, I applied a potential of bout 10 volts to it and observed a tunnel current of about 10 milliamperes. I also observed that the "escape" (useful) current into vacuum was approximately 100 microamperes. In carrying out this test, I simulated the conditions in a standard vacuum tube and used the device in place of a glowing wire of the tube as the emitter or source.

The negative resistance feature of devices of this invention comprising two elements in their superconducting states is illustrated in its full development in FIGS. 19 to 22, inclusive. A device like that of FIG. 17 comprising an aluminum film 85 and a lead film 86 separated by an aluminum oxide film 87 is subjected to a temperature such that both metal films are in their superconducting state. In FIGS. 19 to 21, reference character 89 represents a supply of thermally-excited electrons of aluminum film 85, while holes in that body are represented by reference character 90 and the empty states in lead film 86 are indicated by curve 91.

In FIG. 19 no voltage is applied to the device and this condition accordingly represents the point of intersection of curve T of FIG. 22 with abscissa at the origin. Voltage in millivolts is plotted against current in milliamperes on this chart. Thus there is no tunnel current and no tendency for electrons to tunnel through insulator 87 from film 85 to film 86, thermally excited electrons 89 being inhibited against such tunneling action by the opposing forbidden gap of film 86.

In FIG. 20 voltage is applied to the device and tunneling current flows at a rate increasing rapidly as a function of voltage, as curve T indicates, because it becomes energetically possible for more and more thermally-excited electrons to flow. When the applied voltage increases to one-half the difference between the two energy gaps as FIG. 20 shows, the thermally-excited electrons flowing across insulator 87 face the most favorable density of states condition as indicated by the asymptotic form of empty states curve 91. This means that the tunnel current is flowing at a maximum, represented by point V on curve T. As the voltage is increased still further, as shown in FIG. 21, the tunnel current decreases to point W on curve T because the thermally-excited electrons face a less favorable density-of-states condition than that of FIG. 20. Finally, when the voltage has been increased still further, the current will increase rapidly as curve T indicates due to the fact that it becomes energetically possible for electrons below the forbidden gap of conductor 85 to flow.

The bistable nature of the FIG. 19 device is evident from the chart of FIG. 22 because for certain current values there are two different voltage values as indicated at points X and Y on curve T. Thus the change from point X to point Y and back again is accomplished by subjecting this device to short current pulses of direction depending upon whether the change is to be made from point X to point Y or vice versa.

Referring to FIGS. 23 and 24, the low temperature or cryogenic refrigerator of this invention includes as the central element the new superconducting diode 93 which comprises a non-superconducting metal film 94 on a glass plate 95, an insulating layer 96 and a superconducting metal film 97 spaced from film 93 by the insulating layer. This diode, as those skilled in the art will understand, meets the requirements set forth above for devices of this invention, particularly as to the critical thickness and continuity of the insulating, but tunneling electron-permeable layer. This apparatus further includes a closed shell 99 providing a refrigeration chamber 100 in which diode 93 is disposed. Shell 99 is constructed for immersion in a refrigeration liquid such as a body of liquid helium 101 in a suitable vessel 102 and is constructed to maintain a vacuum in chamber 100 for protracted periods of such immersion. Diode 93 is connected by wires 105 and 106, suitably of superconducting metal such as lead, to a battery 108 and a switch 109, the wires being sealed at points where they enter housing 99 so that the vacuum in chamber 100 is maintained and liquid helium is prevented from entering the chamber during operation of this apparatus.

In use the FIG. 23 apparatus will be arranged generally as shown, chamber 100 being evacuated by any suitable means prior to immersion of shell 99 in the refrigerating liquid. Objects to be refrigerated will be placed in the chamber prior to the evacuation and may be in close proximity to diode 93 for maximum refrigeration effects. With switch 109 closed, electrons will tunnel from conductor 94 into superconductor 97 as FIG. 24 indicates. Expressed mathematically, the tunneling electrons will have an energy of approximately $E-eV+E_f$ when they enter the superconductor, whereas they will have an energy of only approximately $E_f$ when they are introduced into conductor 94. Consequently, heat will be removed from conductor 94 at the rate of $[Ee-V]I$, where $I$ is the current. The electrons introduced into the superconductor may lose their energy mainly either by phonon emission, or if they are very stable in the excited state of the superconductor, they will lose their energy far from the diode junction. A calculation of the maximum possible heat removal based upon a resistance of $10^{-4}$ ohm/cm.$^2$ for insulator 96 is $Q \sim 10^3$ watts/cm.$^2$ at 4.2° K., the efficiency of this process being proportional to temperature, as those skilled in the art will understand.

The low temperature thermometer of this invention illustrated in FIG. 25 again includes diode 93 as the central element. In this instance, however, since refrigeration is not desired, the diode may be disposed in the body of liquid helium 101, in a vessel 102, suitable electric connections being made to the conductors 94 and 97 to determine the temperature in the bath through the current and voltage relationship existing in the diode. Thus, wires 110, 111, 112 and 113, suitably of superconducting metal such as lead, connect the diode to a battery 115 and ammeter 116 and voltmeter 117. By this means the voltage is applied to conductor 94 as in the FIG. 23 circuit and in addition a voltmeter 117 is coupled across the diode. Accordingly, when switch 119 of FIG. 25 apparatus is closed, current flowing through the diode is measured on ammeter 116 and at the same time the voltage across the diode is measured on voltmeter 117.

The current flowing through the insulating film of this device varies exponentially with the applied voltage over a rather wide voltage range. For voltages in the approximate range $\sim kT/e < V < \sim (E-2kT)/e$, where $k$ is Boltzmann's constant, $e$ is electronic charge, T is temperature (° K.), and $E$ is half the energy gap in a superconductor. Since at any particular temperature E is a constant, the following relationship exists $I \sim e^{V/kT}$. Consequently, if we plot $enI$ versus V the slope of the straight line is $$\frac{1}{kT}$$

and gives an absolute measure of the temperature. If the current and voltage have been determined at one particular temperature, use may also be made of the fact that the energy gap is nearly constant for low temperatures and plot $$enI = -\left(\frac{E-V}{k}\right)\frac{1}{T}$$

to obtain the temperature corresponding to any other temperature occurring at that voltage.

Referring to FIG. 26, the present new superconducting diodes are employed in a computer to obtain an analogue function or result and in the embodiment shown, the computer will multiply. The fact that any particular temperature T for voltages greater than $kT/e$ but smaller than $(E-2kT)/e$ the current depends exponentially on voltage makes the device very useful. In this case with $e$ the electronic charge and $E$ being half the energy gap, the following holds true, $I \sim e^{V/kT}$, as previously herein set forth. Accordingly it will be understood by those skilled in the art that by itself this new diode device is naturally suited for exponential functions and natural logarithms. Its use in this way in a simple circuit is illustrated in this drawing wherein 120 is a conventional adder and 121, 122, and 123 are superconducting diodes of this invention. Current inputs to this circuit are indicated at 125 and 126, while the output representing the product of the two current inputs is indicated at 127.

The "printed" circuit of FIG. 27 comprises a plurality of the novel tunnel diodes of this invention and is suitable for use in a variety of ways. It is contemplated, for example, that this kind of printed circuit application of this invention may be used as a memory array in a computer, replacing more expensive components and assemblies known heretofore in the art.

In this device a metal film 130 is applied to a glass plate 131, suitably by means of the evaporation technique described in detail hereinabove. An insulating film of critical thickness in accordance with this invention is likewise formed on the surface of deposit 130 in accordance with the method described above. Then a series of superconducting metal films 133, 134, 135, 136 and 137 are deposited on plate 131 and are extended to overlie the insulating coating on deposit 130. These superconducting metal films, as shown, may normally be separate and spaced apart from each other so that they may function completely independently of each other in the system into which the FIG. 27 device is coupled. These superconducting metal films, it will be understood, will likewise advantageously be deposited by the procedure previously described in detail herein, so that this device can be made economically and with high accuracy and may even be adaptable to mass production techniques. If desired, lead wires may be provided by the vapor deposition or printing technique although in the FIG. 27 embodiment metal films 133 to 137, inclusive, each serve the double purpose of second metal component of the diode sandwich and of electrical lead.

The device of FIG. 27 was made in accordance with the following illustrative, but not limiting, example:

Example VI

Using the apparatus of FIG. 16 equipped with two separate tungsten filaments having separate electric power connectors and following the general procedure set forth in Example I, a strip of aluminum foil was vaporized from one of the filaments and aluminum was vapor deposited on an exposed or unmasked portion of glass plate 131 to produce film 130. This vapor deposition was carried out under a pressure of $5 \times 10^{-5}$ mm. of mercury. The vacuum was then relieved to the extent that the pressure was increased to about 50 microns of mercury by admitting air into bell 59. After a period of 10 minutes at this higher pressure and with the desired insulating, but tunneling electron-permeable, oxide film having been formed over the entire surface of strip 130, the original vacuum was re-established in the bell and lead was similarly vaporized from the other filament and thus vapor deposited on plate 131 which was partially unmasked so that the separate film strips 133 to 137, inclusive, could be simultaneouesly deposited. Relief of the vacuum was not necessary prior to vaporizing the lead foil, mechanical means being provided for accomplishing the unmasking and being operated from a location outside bell 59 through a pressure sealing gland. The vacuum within the bell was then completely relieved and the FIG. 27 device was removed and subjected to tests and found to exhibit the negative resistance characteristic and the bistable property hereinabove described.

In FIG. 28 the tunnel diode device of this invention representing the alternative to the FIG. 2 device previously described comprises a substrate body 140, suitably a glass plate, and a plurality of separate and individual, spaced islands of superconducting metal 141. Islands 141 while shown to be of uniform size and shape may be of random size and shape without materially effecting the operation of the device or the results obtained through its use. The critical thing, as previously stated herein, is the spacing between islands 141, this being of the order of magnitude of from two angstroms to 100 angstroms. Like the sandwich device exemplified in FIG. 2, a potential is applied to this FIG. 28 diode by means of a battery 143 connected by lead wires 144 and 145 to opposite ends of the island chain across plate 140. A tunnel current under certain circumstances previously described will then flow between adjacent islands 141 and a series of such tunnel currents will cooperate to bridge the distance across plate 140.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. An electronic device of the type described comprising a first conductor, an insulator, and a second conductor in a sandwich-like arrangement with the insulator in the form of an electron-permeable continuous film of thickness between two and 1000 angstroms disposed between and separating the first and second conductors and contacting opposed surfaces of the said conductors, the first conductor having a normal resistance state and below a critical temperature having a superconductive state and means for maintaining said first conductor at a temperature below its superconducting critical temperature.

2. An electronic device comprising a first conductor, an insulator, and a second conductor in a sandwich-like arrangement with the insulator in the form of a continuous film of approximately five to 50 angstroms thickness and through which electrons can tunnel, disposed between and separating the first and second conductors and contacting opposed surfaces of the said conductors, the first conductor having a normal resistance state and a superconductive state, below a critical temperature, and means for maintaining said first conductor at a temperature below its superconducting critical temperature.

3. An electronic device of the type described comprising a laminated body made up of an aluminum sheet, a continuous coat of aluminum oxide on the aluminum sheet of thickness between two and 1000 angstroms and a sheet of a metal having a normal resistance state and below a critical temperature having a superconductive state and means for maintaining said laminated body at a temperature below the superconducting critical temperature of the said metal sheet.

4. An electronic device of the type described comprising a laminated body including an aluminum sheet, a lead sheet and a continuous coating of alumina of about five to 50 angstroms thick on the aluminum sheet and spacing the aluminum sheet from the lead sheet and means for maintaining said body at a temperature below the superconducting critical temperature of lead.

5. An electronic device of the type described comprising a first conductor, an insulator, and a second conductor in a sandwich-like ararngement with the insulator disposed between and separating the first and second conductors by a distance of from two to 1000 angstroms, the first conductor having a normal resistance state and below a critical temperature, being superconductive and means for maintaining said first conductor at a temperature below its superconducting critical temperature.

6. An electronic device comprising a laminated body, means for connecting the body in an electric circuit, and means for maintaining the laminated body at a temperature such that an element of said body will be superconducting, the said laminated body comprising a first conductor in the form of a metal film, a second conductor in the form of a film of metal which is superconducting within a certain temperature range, and a continuous film of insulating material between two and 1000 angstroms thick disposed between and engaging the two conductors and through which electrons can tunnel in travel from one of the said conductors to the other.

7. An electronic device comprising a laminated body, means for connecting the body in an electric circuit, and means for maintaining the laminated body at a temperature below 20° K., the said laminated body comprising a first conductor in the form of a metal film, a second conductor in the form of a metal film, the said conductors both being superconductive at temperatures below 20° K., and a continuous film of insulating material of thickness between two and 1000 angstroms disposed between and engaging the two conductors and through which electrons can tunnel in travel from one of said conductors to the other.

8. An electronic device comprising a tantalum film, a lead film, a tantalum oxide film between two and 1000 angstroms thick disposed between opposed surfaces of the tantalum and lead films and in the portion between said metal films being continuous but of thickness such as to permit electrons traveling from one metal film to the other to tunnel through the insulating film, and means for maintaining the tantalum and lead films at a temperature below the superconducting critical temperature of lead.

9. Cryotron apparatus comprising first and second elements each having a superconducting state and a normal resistive state and a body of insulating material disposed between and electrically insulating the said elements, a conductor element and an electron-permeable continuous film between two and 1000 angstroms thick disposed between and separating the conductor element from one of said first and second elements whereby electrons can tunnel through said permeable film tin travel from the conductor element to one of the other of said elements, and means for maintaining the temperature of said first and second elements below their superconducting critical temperatures.

10. An electronic device of the class described comprising a first conductor and a second conductor electrically insulated from the first conductor and spaced from said first conductor from two to 100 angstroms for electron tunneling between the conductors, the said first conductor having a normal resistance state and below a critical temperature having a superconducting state, and means for maintaining said first conductor at a temperature below its superconducting critical temperature.

11. An electronic device comprising an aluminum film, an indium film, and an aluminum oxide film disposed between opposed surfaces of the aluminum and indium films and in the portion between said metal films being continuous and of thickness of from two to 100 angstroms so that an electron tunnel current can flow between the aluminum and indium films, and means for maintaining the temperature of the aluminum and indium films at below their superconducting critical temperatures.

References Cited in the file of this patent

UNITED STATES PATENTS

| | | |
|---|---|---|
| 2,189,122 | Andrews | Feb. 6, 1940 |
| 2,619,443 | Robinson | Nov. 25, 1952 |
| 2,858,239 | Nitsche | Oct. 28, 1958 |
| 2,966,598 | Mackay | Dec. 27, 1960 |
| 2,970,449 | Eichhorn | Feb. 7, 1961 |
| 2,973,441 | Courtney-Pratt | Feb. 28, 1961 |
| 2,989,714 | Park | June 20, 1961 |
| 3,010,285 | Penn | Nov. 28, 1961 |
| 3,021,433 | Morrison | Feb. 13, 1962 |
| 3,025,416 | Johnson | Mar. 13, 1962 |
| 3,056,073 | Mead | Sept. 25, 1962 |
| 3,056,889 | Nyberg | Oct. 2, 1962 |